Sept. 10, 1968     J. G. STRNAD     3,400,472
MATHEMATICS TEACHING DEVICE
Filed March 2, 1967
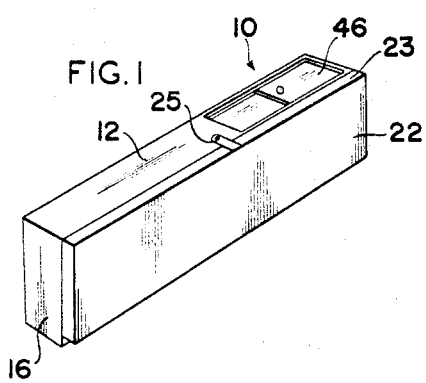
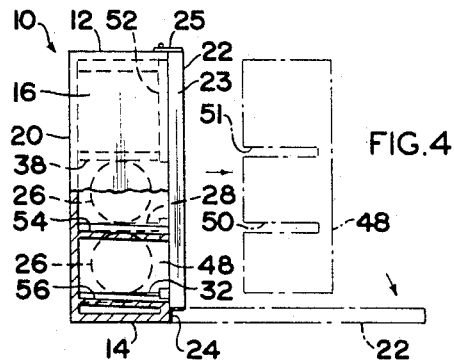
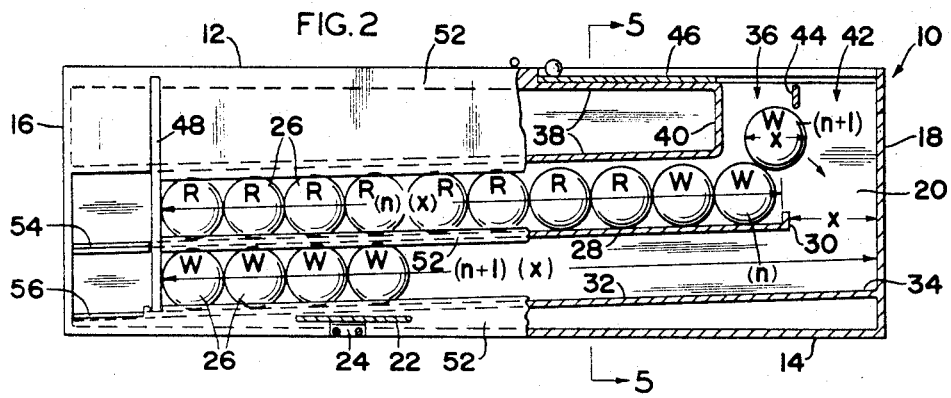
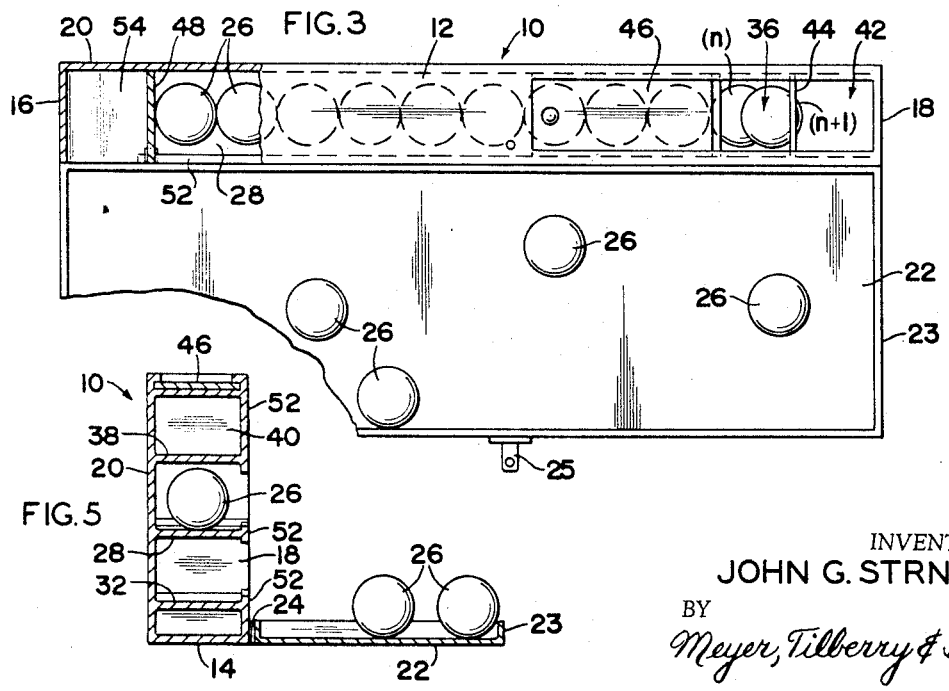
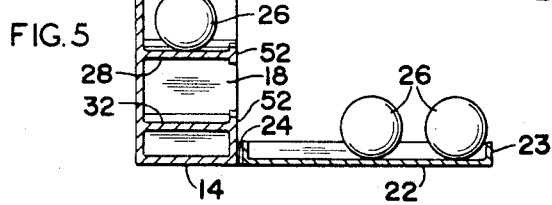
INVENTOR.
JOHN G. STRNAD
BY
*Meyer, Tilberry & Body*
ATTORNEYS.

United States Patent Office 3,400,472
Patented Sept. 10, 1968

3,400,472
MATHEMATICS TEACHING DEVICE
John G. Strnad, Parma, Ohio, assignor to Education Research Council of Greater Cleveland, Cleveland, Ohio, a corporation of Ohio
Filed Mar. 2, 1967, Ser. No. 619,983
6 Claims. (Cl. 35—31)

ABSTRACT OF THE DISCLOSURE

A mathematics teaching device having two superposed inclined ramps mounted in a casing, with the lower ramp having an elevated end extending further up-slope than the upper ramp. An opening in the top of the casing registers with the elevated end of the upper ramp. Balls placed in the opening roll down the upper ramp until the ramp is filled to capacity. Additional balls roll over the elevated end of the upper ramp, landing on the lower ramp.

---

This invention relates to the art of educational visual aids, and more particularly to a mathematics teaching device.

The present invention is particularly applicable as an aid to teaching the mathematical operation of addition, and it will be described with particular reference thereto; however, it will be appreciated that the invention has broader applications and may be used as an aid in teaching other mathematical operations and concepts.

The techniques for introducing rudimentary mathematics to grade school students have undergone sweeping changes in recent years. Prior emphasis on memorization, as a first step towards skills development, has in large measure been replaced by a conceptual understanding of mathematical operations. In keeping with these new techniques, there is a need for improved visual aids and mathematics teaching devices which are capable of illustrating the concepts the student is asked to understand and apply. The present invention is addressed to filling this need.

A better understanding of the present invention may be had by first describing the concepts and defining the terms used in teaching the operation of addition.

As an early exposure to addition the student is taught to combine "sets" of things to form a "union." Thus, $$(0, 0, 0) + (z, z, z, z) = (0, 0, 0, z, z, z, z)$$
$$1, 2, 3 + 4, 5, 6, 7 = 1, 2, 3, 4, 5, 6, 7$$

Next, numerical values are placed on each set, in one-to-one correspondence with the number its members, from which the addition combination $3+4=7$ follows.

Since we use the decimal system of numeration in writing numbers, it is convenient to initially teach all such addition combinations whose sums are 10 or less, and then go on to combinations whose sums are 11 through 19. The transition to these more difficult combinations is simplified by teaching the student to "regroup" the sets to form a set of 10 and then combine. Thus, $$8+5=8+(2+3)$$
$$=(8+2)+3$$
$$=10+3$$
$$=13$$

The mathematics teaching device of the present invention functions to illustrate and demonstrate the concepts of combining sets and regrouping sets, and in this manner aid a student in understanding the principles of basic mathematical operations such as addition.

In accordance with the present invention, there is provided a mathematics teaching device comprising: a casing having a top, a bottom, opposed side walls and a back; and means mounted in the casing and operative to receive a predetermined number end of substantially identically dimensioned, rollable indicia, each having a cross-section of diameter $x$ in at least the plane perpendicular to the plane in which the indicia rolls, comprising: (1) a first inclined ramp extending lengthwise of the casing and having an elevated end spaced a distance at least slightly greater than $x$ from one of the side walls, and sloping downwardly toward the other side wall, for a distance at least equal to $(n)(x)$, (2) a second inclined ramp positioned beneath and generally parallel to the first inclined ramp, having an elevated end extending beyond the elevated end of the first inclined ramp and closer to the one side wall by a distance at least equal to $x$, and sloping downwardly toward the other side wall, for a distance at least equal to $(n+1)(x)$, (3) an opening in the top of the casing registering generally with the $n$th indicia positioned at the elevated end of the first inclined ramp, and (4) guide means depending from the top of the casing toward the first inclined ramp, having a portion overlying a down-slope segment of the $n$th indicia position thereon. Thus, when the $n$th indicia position on the first inclined ramp is filled by successively depositing $n$ indicia thereon, and $n$th plus 1 indicia released into the opening will strike the guide means, glance off the $n$th indicia into the space between the elevated end of the first inclined ramp and the near side wall, and drop onto the second inclined ramp.

Therefore, an object of the present invention is to provide a mathematics teaching device of novel construction.

A further object of the invention is to provide a mathematics teaching device which functions to illustrate and demonstrate the concept of combining set and regrouping sets to aid students in understanding the principles of basic mathematical operations, such as addition.

These and other objects and advantages will become apparent from the following detailed description of a preferred embodiment of the invention when read in connection with the accompanying drawings, in which:

FIGURE 1 is a schematic, pictorial view of a preferred embodiment of the invention;

FIGURE 2 is a schematic, front elevation of the device shown in FIGURE 1 with parts cut away;

FIGURE 3 is a schematic, partial plan view of the device shown in FIGURE 1, with parts cut away;

FIGURE 4 is a schematic, end view of the device shown in FIGURE 1, partially broken away and in section; and FIGURE 5 is a schematic, section view taken generally along line 5—5 of FIGURE 2.

Referring now to the drawings, wherein the showings are for purposes of illustrating preferred embodiments of the invention only, and not for the purpose of limiting the same, FIGURES 1 and 2 show a mathematics teaching device comprising a casing 10 having a top 12, a bottom 14, side walls 16, 18, back 20 and front cover 22 having upstanding peripheral edge 23, connected at the bottom of the casing as by hinges 24. Front cover 22 may be kept in a closed position by latch 25.

The device further comprises means mounted in the casing and operative to receive a predetermined number $n$ of substantially identically dimensioned, rollable indicia, each having a circular cross-section of diameter $x$ (see FIGURE 2) in at least the plane perpendicular to the plane in which the indicia rolls. The indicia may take the form of discs or cylinders, but in the preferred embodiment illustrated are spherical balls 26.

In the embodiment shown in the drawings, the means mounted in the casing comprise a first inclined ramp 28 extending lengthwise of casing 10, having an elevated end 30 spaced a distance at least slightly greater than $x$ from side wall 18, and sloping downwardly toward side wall 16 for a distance at least equal to $(n)(x)$. Thus, for example, when inclined ramp 28 is constructed to hold ten balls 26 as illustrated, the working length of the ramp should be at least ten times the diameter of a ball, and the space between elevated end 30 and side wall 18 should be at least equal to slightly more than the diameter of one ball.

The casing is further provided with a second inclined ramp 32, positioned beneath and generally parallel to inclined ramp 28, having an elevated end 34 extending beyond the elevated end of inclined ramp 28 and closer to side wall 18 by a distance at least equal to $x$, and sloping downwardly toward side wall 16 for a distance at least equal to $(n+1)(x)$ where $n$ and $x$ are defined as above. Thus, for example, when inclined ramp 28 is constructed to hold ten balls, then inclined ramp 32 should be constructed to hold eleven balls, and should have its elevated end 34 closer to side wall 18 than ramp 28's elevated end, by a distance at least equal to the diameter of one ball.

Top 12 of casing 10 is provided with an opening 36 registering generally with the $n$th ball position at the elevated end 30 of inclined ramp 28. Positioned down-slope of opening 36, is guide means depending from top 12 toward inclined ramp 28, shown as generally J-shaped member 38, having a portion 40 over-lying a down-slope segment of the $n$th ball position on inclined ramp 28. Portion 40 of member 38 is so positioned that when the $n$th ball position on ramp 28 is filled by successively depositing $n$ balls 26 thereon, and $n$th plus 1 ball released into opening 36 will strike portion 40, glance off the $n$th ball 26 into the space between elevated end 30 of ramp 28 and side wall 18, and drop onto inclined ramp 32.

Top 12 of casing 10 is provided with a second opening 42 separated from opening 36 by divider 44, and registering with the portion of inclined ramp 32 which extends beyond elevated end 30 of inclined ramp 28. Balls 26 will be deposited in opening 42, where it is desired to place them directly on second inclined ramp 32, bypassing inclined ramp 28. Access to openings 36, 42, may be had by moving sliding plate 46 to the left (as shown in the drawings), where the sliding plate overlies a top surface of J-shaped guide 38. If desired, sliding plate 46 may be moved partially to the left, exposing opening 42 only. When the device is not in use, the sliding plate 46 would normally be in the position shown in FIGURE 1, where both openings 36, 42 are covered.

The device is further provided with removable stop means, such as plate 48, positioned transversely of inclined ramps 28, 32, at a distance $(n)(x)$ and $(n+1)(x)$, respectively, from the elevated ends 30, 34, thereof. The upper edge of plate 48 fits in a slot in the top of casing 10, and the lower edge rests on inclined ramp 32. The plate is provided with slots 50, 51 which embrace the upper and lower surfaces of inclined ramp 28 and guide 38, respectively. When in position, plate 48 serves as a stop to limit the rolling movement of the first ball deposited on inclined ramps 28, 32.

The device is further provided with longitudinally extending ball guide means, such as facings 52, positioned along the front edges of inclined ramps 28, 32, extending from plate 48, up-slope to their elevated ends 30, 34 respectively. Facings 52 serve to restrain the balls to movement longitudinally of ramps 28, 32.

Inclined ramps 28, 32 are provided respectively with discharge sections 54, 56, located down-slope with respect to plate 48. It will be noted that facings 52 do not extend into discharge sections 54, 56. The discharge sections are tilted slightly forward (see FIGURE 4), so that when the plate 48 is removed, balls 26 will roll down into discharge sections 54, 56, and then roll forward out of the casing.

When the device is open and ready for use, front cover 22 with its upstanding peripheral edge 23 is positioned as shown in FIGURE 3, and can serve as a tray to hold the balls prior to their being inserted in the device. In addition, front cover 22 serves to catch the balls when they are removed from the device upon withdrawal of plate 48.

The device may be used to illustrate the concepts of combining and regrouping sets in the following manner. For purposes of this discussion, a set of eight and a set of seven will be regrouped and combined. The visual impact of demonstrations with the device can be heightened by using balls of different colors to identify the members of the different sets. Thus, the set of eight may be represented by red balls (marked R in the drawings) and the set of seven may be represented by white balls (marked with a W in the drawings).

The composition of the sets may be shown severally, by depositing the red balls in opening 36, and the white balls in opening 42. This will provide a set of eight red balls on inclined ramp 28, and a set of seven balls on inclined ramp 32. The balls can then be removed from the casing by withdrawing plate 48 and collecting the balls in the tray formed by front cover 22.

These two sets may then be regrouped and combined to form a set of ten by first placing all of the red balls in opening 36 followed by placing all of the white balls in opening 36. Due to the construction of the device, all of the red balls and two of the white balls will rest on inclined ramp 28, forming a set of ten, and the remaining five white balls will fall on the inclined ramp 32.

FIGURE 2 shows the apparatus just after the third or $n+1$ white ball has been deposited in opening 36. With the $n$th ball position on inclined ramp 28 filled by the second white ball, the third white ball when deposited in opening 36 will strike portion 40 of J-shaped guide 38, glance off the $n$th ball, into the space between elevated end 30 of inclined ramp 28 and side wall 18, and then drop onto inclined ramp 32. The $n+1$ ball will not simply come to rest on top of the $n$th ball due to the fact that portion 40 of J-shaped guide 38 overlies a down-slope segment of the $n$th ball positioned on inclined ramp 28. This causes the center of gravity of the $n+1$ ball to fall to the right (as shown in the drawing) of the center of gravity of the $n$th ball, thus providing the $n+1$ ball with enough inertia to move it into the space between elevated end 30 of inclined ramp 28 and side wall 18.

If the student can anticipate the proper regrouping of the sets to form a set of 10, the device can be used to confirm this. If, however, the student is not able to anticipate the proper regrouping of the sets, the device will automatically provide the solution.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. A mathematics teaching device comprising: a casing having a top, a bottom, opposed side walls and a back; and means mounted in said casing and operative to receive a predetermined number $n$ of substantially identically dimensioned, rollable indicia, each having a circular cross-section of diameter $x$ in at least the plane perpendicular to the plane in which said indicia rolls, comprising: (1) a first inclined ramp extending lengthwise of said casing and having an elevated end spaced a distance at least slightly greater than $x$ from one of said side walls and sloping downwardly toward said other side wall for a distance at least equal to $(n)(x)$, (2) a second inclined ramp positioned beneath and generally parallel to said first inclined ramp, having an elevated end extending beyond the elevated end of said first inclined ramp and closer to said one side wall by a distance at least equal to $x$ and sloping downwardly toward said other side wall for a distance at least equal to $(n+1)(x)$, and (3) an opening in the top of said casing registering generally with $n$th indicia position at the elevated end of said first inclined ramp, and guide means depending from said top toward said first inclined ramp having a portion overlying a down slope segment of the $n$th indicia position thereon, whereby when said $n$th indicia position is filled by successively depositing $n$ indicia on said first inclined ramp an $n$th$+1$ indicia released into said opening will strike said guide means, glance off the $n$th indicia into the space between the elevated end of said first inclined ramp and said one side wall, and drop onto said second inclined ramp.

2. The mathematics teaching device as defined in claim 1, wherein the top of said casing is provided with a second opening registering with the portion of said second inclined ramp which extends beyond the elevated end of said first inclined ramp, whereby indicia may be deposited directly on the portion of said second inclined ramp.

3. The mathematics teaching device as defined in claim 1, further comprising removable stop means positioned transversely of said first and second inclined ramps at a distance $(n)(x)$ and $(n+1)(x)$, respectively from the elevated ends thereof.

4. The mathematics teaching device as defined in claim 1, further comprising a front cover for said device hinged toward the bottom thereof, and having an upstanding peripheral edge, said cover, when open, adapted to serve as a tray to hold indicia when not in use.

5. The mathematics teaching device as defined in claim 3, wherein said first and second inclined ramps are provided with discharge sections positioned down-slope of said removable stop means and tilted toward the front of said casing, whereby upon removal of said stop means, any indicia on said ramps roll down onto said discharge sections and then forwardly out the front of said casing.

6. The mathematics teaching device as defined in claim 5, further comprising guide means positioned along the front edges of said ramps and extending longitudinally thereof from said removable stop means to the elevated ends thereof, operative to restrain said indicia to movement longitudinally of said ramps.

References Cited

UNITED STATES PATENTS

| | | | |
|---|---|---|---|
| 3,006,082 | 10/1961 | Libbey | 35—30 |
| 3,295,229 | 1/1967 | Fisher | 35—31 |
| 3,331,143 | 7/1967 | Weisbecker | 35—30 |

EUGENE R. CAPOZIO, *Primary Examiner.*

WILLIAM H. GRIEB, *Assistant Examiner.*